United States Patent [19]

Shelso et al.

[11] Patent Number: 5,536,521

[45] Date of Patent: Jul. 16, 1996

[54] RAPIDLY HYDRATABLE KONJAC FLOUR

[75] Inventors: Gerald J. Shelso, Rockland; Robert Kopesky, Camden, both of Me.; William R. Thomas, Newtown, Pa.; Frederick L. Robinson, Thomaston, Me.

[73] Assignee: FMC Corporation, Philadelphia, Pa.

[21] Appl. No.: 770,801

[22] Filed: Oct. 3, 1991

[51] Int. Cl.$^6$ .................................................. A21D 6/00
[52] U.S. Cl. ........................ 426/550; 426/555; 426/622; 426/463
[58] Field of Search ............................. 426/550, 555, 426/622, 463

[56] References Cited

U.S. PATENT DOCUMENTS

| | | | |
|---|---|---|---|
| 3,767,424 | 10/1973 | Shimizu | 426/464 |
| 3,928,322 | 12/1975 | Sugiyama | 127/54 |
| 4,379,173 | 4/1983 | Masuyama | 426/804 |
| 5,009,915 | 4/1991 | Ogawa | 426/615 |

FOREIGN PATENT DOCUMENTS

| | | |
|---|---|---|
| 55-092667 | 7/1980 | Japan. |
| 63-185345 | 7/1988 | Japan. |

OTHER PUBLICATIONS

Ingredients–Konjac Flour Food Technology Apr. 1990 p. 166.

Ingredients–Konjac Four Food Technology Dec. 1989 p. 110.

*Primary Examiner*—Carolyn Paden
*Attorney, Agent, or Firm*—Richard E. Elden; Robert L. Andersen; Polly E. Ramstad

[57] ABSTRACT

A rapidly hydratable konjac flour is disclosed which is distinguishable from native konjac flour in that it gains at least 60% of its potential peak viscosity within 10 minutes after dispersal into water at 25° C., at least 80% of its potential peak viscosity within 20 minutes after dispersal into water at 25° C., and from 80 to 100% of its potential peak viscosity within 30 minutes after dispersal into water at 25° C. Methods for manufacturing rapidly hydratable konjac flour and uses for the inventive flour also are disclosed.

3 Claims, 1 Drawing Sheet

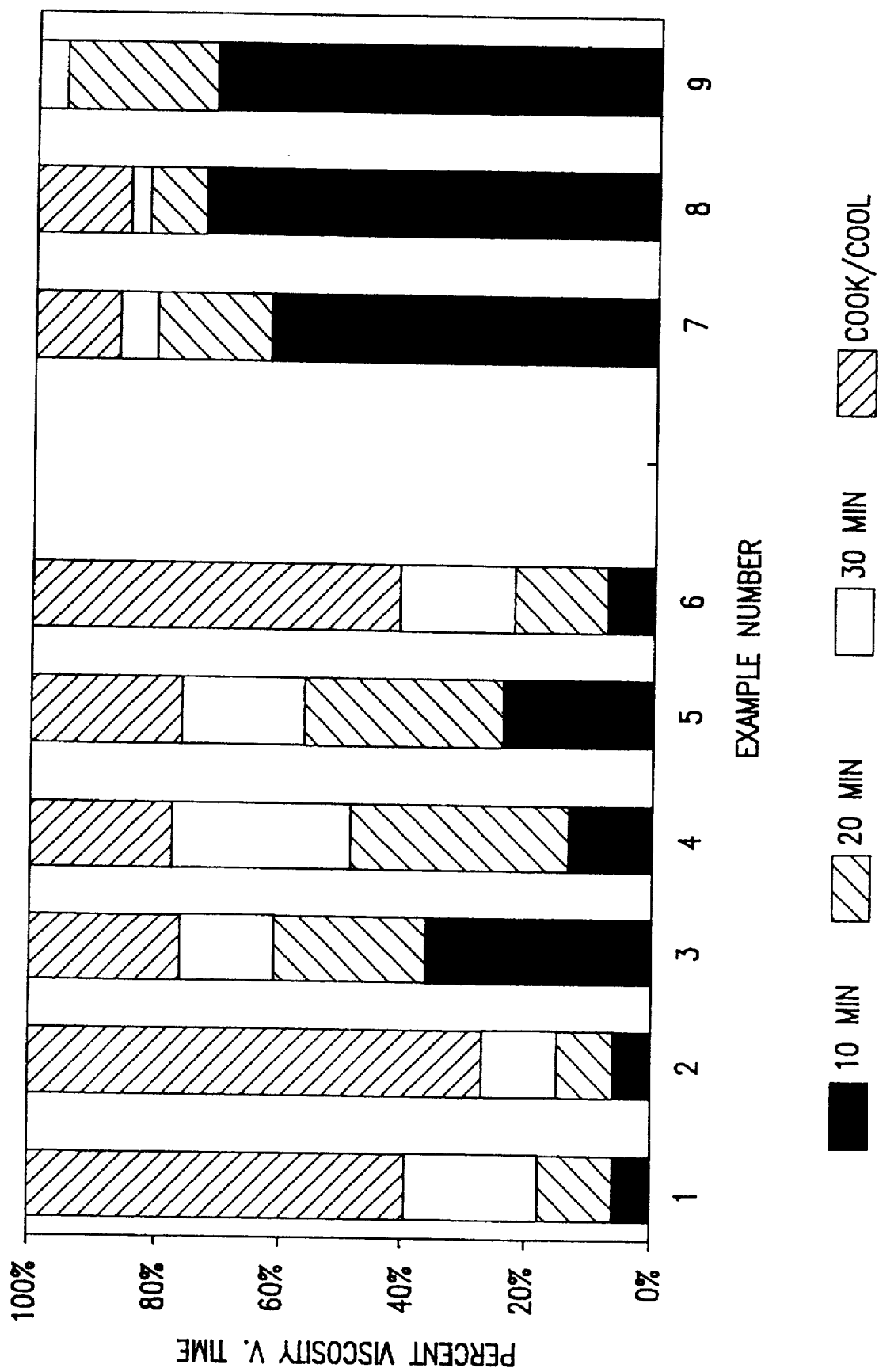

5,536,521

RAPIDLY HYDRATABLE KONJAC FLOUR

BACKGROUND OF THE INVENTION

1. Field of the Invention

This invention relates to a mechanically processed konjac flour that hydrates more rapidly than native (unprocessed) konjac flour and methods for its production including [a] moistening native konjac flour to plasticize it and then milling it to form a flake, followed by grinding of the flake; and [b] cryogenic grinding of dry native konjac flour.

2. Statement of Related Art

Konjac (*Amorphophallus konjac*) is a plant whose tuber is the source of a well-known foodstuff in China and Japan, namely konjac flour. This flour contains a variety of insoluble materials as well as a major amount of desirable water-soluble substances. When dispersed in water, it forms a highly viscous sol of soluble polysaccharides. The principal soluble constituent is glucomannan, a polysaccharide comprised of D-glucose and D-mannose, which is useful as an ingredient in various foodstuffs, as well as in industrial applications such as films, oil drilling fluids, and paints.

Konjac flour is made by slicing konjac tubers into thin slices, drying, then grinding in a very low speed grinder to break the "tachiko" matrix away from the glucomannan-containing granulets or "sacs". A winnowing (i.e.—air classification) separates the larger, more dense sacs from the tachiko dust.

There are numerous impurities in native konjac flour, including insoluble starches, cellulose, and nitrogen-containing materials, including proteins, many of which impurities constitute the "sacs" which encapsulate the konjac flour in the tuber. These sacs are small, oblong, and lens shaped and are as large as 0.5 mm in length. The size of the sac is believed to vary with the species of konjac, and/or with the age of the plant before harvest. Because of its relatively large sacs, native konjac flour has excellent dispersibility in water, but it takes a long time for the maximum viscosity of an aqueous sol to be reached, usually requiring heating and agitation. Stated in another way, the hydration rate of native konjac flour in room temperature or cool water is relatively slow. This slow hydration is a problem for many uses of native konjac flour, particularly those which employ continuous flow production. To speed up the hydration rate generally requires a reduction in particle size. However, even in a conventional cold mill (which would be the mill of choice to those skilled in the art), grinding causes the konjac flour to degrade as evidenced by its turning brown and smelling burnt, and importantly, also causes a large reduction in attainable viscosity.

Japanese published patent application 63-185345 discloses adding 3 to 20 parts by weight (pbw) of water to 1 pbw of konjac flour to allow swelling of the konjac flour to blocks of sol. To these blocks are added at least 20 wt % alcohol, and they are then wet-ground in what appears to be a high speed blender.

Japanese published patent application 55-92667 discloses freezing sliced and dried konjac tubers in liquid nitrogen and then grinding them to a fine powder in a gaseous nitrogen atmosphere at −50° C. or below, for the purpose of preserving its flavor, fragrance and resilient texture.

U.S. Pat. No. 3,928,322 discloses a classical laboratory method for obtaining small amounts of pure carbohydrates, in particular the glucomannan from konjac flour. Konjac flour is made into an aqueous sol, filtered, the filtrate dialyzed against water, and then lyophilized to recover the solids.

SUMMARY OF THE INVENTION

This invention comprises a rapidly hydratable konjac flour. It also comprises methods for manufacturing rapidly hydratable konjac flour including [a] tempering native konjac flour to a high moisture level until it is plasticized, milling it between two surfaces to create a "flake", drying the flake, and then grinding it; and [b] using cooling means such as exposure to liquid nitrogen to make crude konjac flour particles sufficiently brittle to fracture easily and also reduce the molecular degradation caused by local heat energy, followed or accompanied by grinding.

The inventive methods reduce the particle size of native konjac flour without causing heat degradation (such as evidenced by browning, a burnt odor, and viscosity loss). The reduction in particle size, and specifically the rupture of the natural sacs present in konjac flour, affords a konjac flour that is readily and rapidly hydratable in cold or room temperature water while maintaining a high peak viscosity level.

DESCRIPTION OF THE DRAWING

The Figure is a comparative graph of konjac flour profile bar elements showing the percentage viscosity gain in water at 25° C. over time for various konjac flours (based upon a separately determined 100% eventual viscosity gain for each profile). Each bar element corresponds to the herein described Example of the same number. Bar elements 1 through 6 are prior art and bar elements 7 through 9 are according to this invention.

DETAILED DESCRIPTION OF THE INVENTION

Other than in the operating examples, or where otherwise indicated, all numbers expressing quantities of ingredients, parameters, or reaction conditions used herein are to be understood as modified in all instances by the term "about".

The rapidly hydratable konjac flour of this invention is characterized by a percentage potential viscosity gain of at least 60% after a 10 minute period, of at least 80% after a 20 minute period, and/or of from 80 to 100% after a 30 minute period, all measured in water at 25° C. and all based upon a predetermined maximum (100%) viscosity gain. This compares favorably to native konjac flour which on average has a percentage viscosity gain of less than 40% after 10 minutes and 60% or less after 20 minutes, also measured in water at 25° C. and based upon a predetermined maximum (100%) viscosity gain.

Native konjac flour (that is, slowly hydratable konjac flour) must be heated, preferably accompanied by stirring, for a considerable time before it can be dissolved or suspended in water. The rapidly hydratable konjac flour of this invention can be dissolved or suspended in water at temperatures below 30° C., (and particularly at room temperature or 20°–25° C.), almost immediately, thus offering obvious advantages over native konjac flour when used in continuous flow production processes as well as batch processes.

The rapidly hydratable konjac flour according to this invention opens up many new applications due to its considerably faster rate of viscosity development in cold water.

In baked goods such as cakes, konjac flour improves the moisture content and imparts organoleptic properties that make the goods appear to contain more fat than they actually do. Thus, it may serve as a fat substitute. Normal (crude)

konjac flour requires pre-hydration before use, or it loses its advantage and imparts a gritty feel to the product. By contrast, the rapidly hydratable konjac flour of this invention picks up water so fast that it hydrates sufficiently in the relatively short mixing time available before such goods are baked. It also permits more rapid formation of konjac sols and gels, which are then further processed for other food and industrial uses.

In water desert gels, the rapidly hydratable konjac flour of this invention has sufficient time to dissolve and synergistically react with other components such as kappa-carrageenan.

Further, rapid hydration of konjac flour permits many industrial uses such as oil well fracturing, where the rapid development of high viscosity sols would be welcome.

The konjac flour sacs from various Amorphophallus species ranges from approximately 100 to 500 microns in size. A sample of *A. oncophyllus* with intact sacs that was tested for granulation had a size range of 75 to 125 microns, but the hydration rate of even this smaller than usual particle size konjac flour, (while faster than average), was not within the minimum acceptable range of this invention and therefore would be improved by the inventive sac bursting and particle size reduction methods.

EXAMPLES

The following examples all correspond to the bar graph elements in the accompanying Drawing. The first six examples are exemplary of the prior art, the first four being various untreated konjac flours and the fifth and sixth being konjac flour only partially treated according to invention methods. Examples seven through nine are rapidly hydratable konjac flour according to the present invention. Since the purpose of this invention is to afford a rapidly hydratable konjac, this can readily be indicated by the rapidity with which a konjac flour sample reaches a given viscosity gain within a given time period. So that the samples could be compared properly, each was measured against the maximum potential viscosity for that particular sample that could be reached upon heating accompanied by shearing, followed by cooling. This provided an objective standard for comparison.

Test Method for Viscosity Determination

The data for the Drawing and following examples was determined using the following procedure. The sample to be tested (5.00 g) was dispersed into 495 g of deionized water which was at 25° C., and mixed for one minute, using an electric motor driving an ss three-bladed stirrer at a speed short of sucking air into the formed vortex. The mixture was then immediately poured into the bowl of the viscosity measuring instrument, cooling probe down, which instrument was equipped with a 700 cmg sensitivity cartridge, rotational speed of 150 rpm. The instrument employed was a Visco/Amylo/Graph™ Model VAVE, (product of C. W. Brabender Instruments, Inc., South Hackensack, N.J., U.S.A.).

The test timing schedule was as follows:
Hold 30 minutes at 25° C.;
Heat to 95° C. at a rate of 1.5° C., increase per minute;
Hold 15 minutes at 95° C.;
Cool to 25° C. at a rate of 1.5° C. per minute;
Hold 15 minutes at 25° C.

Example 1

This was an untreated (prior art) sample of native konjac flour identified as a Chinese origin commodity product of unspecified source which was internally designated lot 89-9608, and corresponds to bar element 1 of the Drawing. As can be seen, after 10 and twenty minutes, respectively, less than 20% of its potential viscosity was reached, and after 30 minutes less than 40% of its potential viscosity was reached. This indicated that the sample was not rapidly hydratable, and is illustrative of the problem overcome by the present invention.

Example 2

This was an untreated (prior art) sample of native konjac flour identified as a Chinese origin commodity product of unspecified source which was internally designated lot 89-9610, and corresponds to bar element 2 of the Drawing. As can be seen, after 10 and 20 minutes, respectively, less than 20% of its potential viscosity was reached, and after 30 minutes less than 40% of its potential viscosity was reached. This indicated that the sample was not rapidly hydratable, and is illustrative of the problem overcome by the present invention.

Example 3

This was an untreated (prior art) sample of native konjac flour identified as a Chinese origin commodity product of unspecified source which was internally designated lot R-3124 and corresponds to bar element 3 of the Drawing. As can be seen, after 10 minutes less than 40% of its potential viscosity was reached, after 20 minutes only about 60% of its potential viscosity was reached, and after 30 minutes less than 80% of its potential viscosity was reached. This indicated that the sample was not rapidly hydratable, and is illustrative of the problem overcome by the present invention.

Example 4

This was a (prior art) sample of a treated native konjac flour sold in Japan as a commodity product under the name "Propol A", in which the native konjac flour has been alcohol washed in a known manner to further purify it, but in which the konjac sacs are unbroken. It corresponds to bar element 4 of the Drawing. As can be seen, after 10 minutes less than 20% of its potential viscosity was reached, after 20 minutes less than 60% of its potential viscosity was reached, and after 30 minutes less than 80% of its potential viscosity was reached. This indicated that the sample was not rapidly hydratable, and is illustrative of the problem overcome by the present invention.

Example 5

This was a partially treated (prior art) sample of native konjac flour which was milled (but not ground) in the following manner, and which corresponds to bar element 5 of the Drawing. Native konjac flour (5.25 lbs / 2.4 k) having a moisture content of 14% was mixed for 30 minutes together with deionized water (5.5 lbs / 2.5 k) in a Hobart™ model A120 mixer (product of Hobart Corp., Troy, Ohio, U.S.A.). Then this mixture was milled using a 3-roll mill having 5 in. (12.7 cm) diameter hollow rolls which were 12 in. (30.5 cm) in length. The zero gap between these rolls was adjusted by hand screws, and the rolls had cooling water running through their interiors. The three rolls were turned at 35 rpm, 70 rpm, and 140 rpm respectively. The feed, comprising plasticised native konjac flour, had a water content of 58%. After running the feed mixture through the mill three times, "flaked" konjac flour particles were produced. The flaked konjac flour was then spread on trays and dried overnight in a 50° C. forced draft oven, after which it was allowed to stand at ambient conditions for 24 hours before being collected. This sample corresponds to bar element 5 of the Drawing. As can be seen, after 10 minutes less than 40 % of its potential viscosity was reached, after 20 minutes less than 60 % of its potential viscosity was reached, and after 30 minutes less than 80% of its potential viscosity was reached.

Commentary

This Example indicated that despite milling with cooled mill rollers, the sample was not rapidly hydratable, and illustrates that partial completion of an inventive process (that is, the first half) did not solve the problem overcome by the present invention.

Example 6

This was a partially treated (prior art) sample of native konjac flour which was ground (but not milled) in the following manner, and which corresponds to bar element 6 of the Drawing. The starting material was the same as in Examples 5 and 8. While Example 5 subjected the native konjak flour only to a "milling" step, Example 6 subjected the same native konjak flour only to a "grinding" step. Native konjak flour having a moisture content of 14% was ground in a Powdertec™ model 3090 sample grinder (a product of Tecator Inc., Herndon, Va. U.S.A.) which was equipped with a 0.2 mm screen, and which had a tip speed of about 14,000 feet per minute (4,593 meters per minute). The native konjac flour was fed into the grinder, ground rapidly, and collected in a nylon bag. As can be seen from Drawing bar element 6, after 10 minutes considerably less than 20% of its potential viscosity was reached, after 20 minutes only slightly more than 20% of its potential viscosity was reached, and after 30 minutes only slightly more than 40% of its potential viscosity was reached.

Commentary

This Example indicated that despite grinding native konjac flour in a standard device used for such purposes, and despite original expectations, the resulting sample was not rapidly hydratable. This Example is particularly illustrative of the early attempts to achieve a rapidly hydratable konjac flour and illustrates the initial problem overcome by the present invention. It also illustrates that partial completion of an inventive process (that is, the second half) does not solve the problem overcome by the present invention. Thus, neither one of the two mechanical steps of one of the invention embodiments taken alone, was sufficient to produce the inventive product. It may be noted that the results of Drawing bar element 6 are comparable to that of the unprocessed native konjac flour of Drawing bar element 1.

Examle 7

This was a cryogenically ground sample of rapidly hydratable konjac flour according to this invention, corresponding to bar element 7 of the Drawing, which was prepared in the following manner. An untreated (prior art) sample of native konjac flour identified as a Chinese origin commodity product of unspecified source which was internally designated lot 89-9608, was ground in one continuing process using a 20 U.S. h.p. (20.28 metric h.p.) ACM—10 mill (product of Micro Powder Systems, Summit N.J., U.S.A.). The cooling means comprised equipping the mill with a Cryo-Grind™ cooling conveyor using a 13:1 ratio of nitrogen: crude konjac flour, specifically using 13 pounds (5.9 k) of liquid nitrogen (product of Air Products and Chemicals, Inc., Emmaus, Pa., U.S.A.). The grinding was sufficient for the completed particles to pass through a 100 Tyler mesh (149 micron) screen at the rate of 50 lbs (22.7 k) per hour. As can be seen from bar element 6 of the Drawing, after 10 minutes more than 60% of its potential viscosity was reached, after 20 minutes about 80% of its potential viscosity was reached, and after 30 minutes more than 80% of its potential viscosity was reached. This clearly indicates that the sample was rapidly hydratable and therefore was in accordance with this invention.

Commentary

The amount of cryogenic cooling must minimally be cooling-effective, which can be defined as sufficient to prevent konjac flour degradation (browning and undesireable smell). Although any inert liquified gas can be employed, liquid nitrogen is the cooling means of choice because it is easy to handle and readily available. Other liquified inert gases that can be used include helium, argon, and neon. While non-inert liquified gases theoretically could be used for cooling, they present a danger of reaction with the konjac flour or perhaps of an explosion. Other means for cooling than gasification of a liquid, such as conducting the entire grinding process in a refrigerated environment or sufficiently cooling the crude konjac flour immediately before it is ground also may be employed.

Example 8

This was a cryogenically ground sample of rapidly hydratable konjac flour according this invention, corresponding to bar element 8 of the Drawing, which was prepared in the following manner.

An untreated (prior art) sample of native konjac flour identified as a Chinese origin commodity product of unspecified source which was internally designated lot 89-9608, was ground in one continuing process using a 20 U.S. h.p. (20.28 metric h.p.) ACM—10 mill (product of Micro Powder Systems, Summit, N.J., U.S.A.) equipped with a Cryo-Grind™ cooling conveyor (product of Air Products and Chemicals, Inc., Emmaus. Pa., U.S.A.). The grinding was sufficient for the completed particles to pass through a 200 Tyler mesh (74 micron) screen at the rate of 40 lbs (18.2 k) per hour, using a 20:1 ratio of nitrogen: crude konjac flour, specifically using 20 pounds (9.1 k) of nitrogen. As can be seen from the Drawing, after 10 minutes substantially more than 60% of its potential viscosity was reached, after 20 minutes slightly more than 80% of its potential viscosity was reached, and after 30 minutes still more than 80% of its potential viscosity was reached. This clearly indicated that the sample was rapidly hydratable and therefore was in accordance with this invention.

Example 9

This was a two step (milled and then ground) sample of rapidly hydratable konjac flour according to this invention, corresponding to bar element 9 of the Drawing, which was prepared in the following manner.

Step A—Native konjac flour (5.25 lbs / 2.4 k) having a moisture content of 14% was mixed for 30 minutes together with deionized water (5.5 lbs / 2.5 k) in a Hobart™ model A120 mixer (product of Hobart Corp., Troy, Ohio, U.S.A.). Then this mixture was milled using a 3-roll mill having 5 in. (12.7 cm) diameter hollow rolls which were 12 in. (30.5 cm) in length. The zero gap between these walls was adjusted by hand screws, and the rolls had cooling water running through their interiors. The three rolls were turned at 35 rpm, 70 rpm, and 140 rpm respectively. The feed, comprising native konjac flour particles, had a water content of 58%. After running the feed mixture through the mill three times, "flaked" konjac flour particles were produced. The flaked konjac flour particles were then spread on trays and dried overnight in a 50° C. forced draft oven, after which they were allowed to stand at ambient conditions for 24 hours before being collected. The flaked konjac flour itself did not demonstrate rapidly hydratable qualities, and was only an intermediate product.

Step B—The flaked konjac flour particles of Step A were then further treated by grinding in a Powdertec™ model 3090 sample grinder (product of Tecator, Inc., Herndon, Va., U.S.A.) equipped with a 0.2 mm screen, and having a tip speed of about 14,000 feet/minute (4,593 m/minute). The flaked particles were fed in to this grinder, ground rapidly, and collected in a nylon bag. As can be seen from bar element 9 of the Drawing, after 10 minutes more than 60% of its potential viscosity was reached, after 20 minutes more than 80% of its potential viscosity was reached, and after 30 minutes 100% of its potential viscosity was reached. This clearly indicated that the collected milled and then ground particles was a rapidly hydratable konjac flour according to this invention.

Commentary

The particular milling and grinding devices disclosed should be considered merely typical of those that can be used in this process. The critical point in the process is not the equipment used, but rather that it is conducted in two steps, the first of which mills a (preferably water) plasticized mass into an intermediate konjac flour "flaked" particle and the second of which grinds the flake to produce the inventive rapidly hydratable konjac flour. The terms "mill" and "grind" arbitrarily have been chosen to distinguish the two inventive steps and should not otherwise be considered as significant.

We claim:

1. A method for producing a rapidly hydratable konjac flour characterized in that it gains at least 60% of its potential peak viscosity within 10 minutes after dispersal into water at 25° C. and in that it is free of organic solvent residues; said method characterized by the sequential steps of:

[A] plasticizing native konjac flour by mixing it with a plasticizing-effective amount of water;

[B] milling the plasticized native konjac flour into konjac flour flakes by passing the plasticized konjac flour through a roll milling means whose pressure between its rollers is at least adequate to rupture substantially all konjac sacs contained within said native konjac flour;

[C] drying the konjac flour flakes; and

[D] mechanically grinding the konjac flour flakes sufficiently to produce said rapidly hydratable konjac flour.

2. A method for producing a rapidly hydratable konjac flour characterized in that it gains at least 80% of its potential peak viscosity within 20 minutes after dispersal into water at 25° C. and in that it is free of organic solvent residues; said method characterized by the sequential steps of:

[A] plasticizing native konjac flour by mixing it with a plasticizing-effective amount of water;

[B] milling the plasticized native konjac flour into konjac flour flakes by passing the plasticized konjac flour through a roll milling means whose pressure between its rollers is at least adequate to rupture substantially all konjac sacs contained within said native konjac flour;

[C] drying the konjac flour flakes; and

[D] mechanically grinding the konjac flour flakes sufficiently to produce said rapidly hydratable konjac flour.

3. A method for producing a rapidly hydratable konjac flour characterized in that it gains from 80 to 100% of its potential peak viscosity within 30 minutes after dispersal into water at 25° C. and in that it is free of organic solvent residues; said method characterized by the sequential steps of:

[A] plasticizing native konjac flour by mixing it with a plasticizing-effective amount of water;

[B] milling the plasticized native konjac flour into konjac flour flakes by passing the plasticized konjac flour through a roll milling means whose pressure between its rollers is at least adequate to rupture substantially all konjac sacs contained within said native konjac flour;

[C] drying the konjac flour flakes; and

[D] mechanically grinding the konjac flour flakes sufficiently to produce said rapidly hydratable konjac flour.

\* \* \* \* \*